(12) United States Patent
Voss

(10) Patent No.: US 11,616,749 B2
(45) Date of Patent: *Mar. 28, 2023

(54) CHAT HIGHLIGHTS

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,330

(22) Filed: Oct. 19, 2021

(65) Prior Publication Data

US 2022/0052975 A1 Feb. 17, 2022

Related U.S. Application Data

(63) Continuation of application No. 16/297,128, filed on Mar. 8, 2019, now Pat. No. 11,178,089.

(51) Int. Cl.
*H04L 51/216* (2022.01)
*H04L 51/04* (2022.01)
*H04L 51/08* (2022.01)
*H04L 51/224* (2022.01)
*H04L 51/52* (2022.01)

(52) U.S. Cl.
CPC ............ *H04L 51/216* (2022.05); *H04L 51/04* (2013.01); *H04L 51/08* (2013.01); *H04L 51/224* (2022.05); *H04L 51/52* (2022.05)

(58) Field of Classification Search
None
See application file for complete search history.

(56) References Cited

U.S. PATENT DOCUMENTS

| 7,703,094 B2 * | 4/2010 | Mongkolsmai ..... G06F 11/3612 718/100 |
| 8,055,715 B2 * | 11/2011 | Bensky ................ G06Q 10/107 707/758 |

(Continued)

OTHER PUBLICATIONS

"U.S. Appl. No. 16/297,128, Advisory Action dated Jun. 28, 2021".

(Continued)

*Primary Examiner* — Mohamed Ibrahim
(74) *Attorney, Agent, or Firm* — Schwegman Lundberg & Woessner, P.A.

(57) ABSTRACT

Aspects of the present disclosure involve a system comprising a computer-readable storage medium storing a program and method for presenting chat highlights. The program and method include generating a group profile for a plurality of users that includes a plurality of conversation segments; identifying a group of consecutively exchanged messages in a first of the plurality of conversation segments for which a difference between a starting time stamp of a first message in the group of consecutive messages and an ending time stamp of a last message in the group of consecutive messages is less than a threshold time interval representing consecutively exchanged messages; generating for display an interactive visual representation of the identified group of consecutive messages; and in response to receiving a user input that selects the interactive visual representation, generating for display a portion of the identified group of consecutive messages.

20 Claims, 10 Drawing Sheets

(56) References Cited

U.S. PATENT DOCUMENTS

| | | |
|---|---|---|
| 9,485,633 B2 * | 11/2016 | Lynn ...................... H04L 51/58 |
| 11,178,089 B1 | 11/2021 | Voss |
| 2007/0186172 A1 | 8/2007 | Sego et al. |
| 2012/0124148 A1 | 5/2012 | Hamlin et al. |
| 2015/0346955 A1 | 12/2015 | Fundament et al. |
| 2016/0234152 A1 | 8/2016 | Allen et al. |
| 2017/0230325 A1 | 8/2017 | Pirnazar |
| 2017/0353414 A1 | 12/2017 | Ertmann et al. |

OTHER PUBLICATIONS

"U.S. Appl. No. 16/297,128, Final Office Action dated Apr. 20, 2021", 16 pgs.

"U.S. Appl. No. 16/297,128, Non Final Office Action dated Nov. 5, 2020", 13 pgs.

"U.S. Appl. No. 16/297,128, Notice of Allowance dated Jul. 14, 2021", 8 pgs.

"U.S. Appl. No. 16/297,128, Response filed Feb. 4, 2021 to Non Final Office Action dated Nov. 5, 2020", 12 pgs.

"U.S. Appl. No. 16/297,128, Response filed Jun. 16, 2021 to Final Office Action dated Apr. 20, 2021", 13 pages.

U.S. Appl. No. 16/297,128, filed Mar. 8, 2019, Chat Highlights.

* cited by examiner

CHAT HIGHLIGHTS

CLAIM OF PRIORITY

This application is a continuation of U.S. patent application Ser. No. 16/297,128, filed on Mar. 8, 2019, which is hereby incorporated by reference in its entirety.

TECHNICAL FIELD

The present disclosure relates generally to conversation systems in messaging applications.

BACKGROUND

Users are always seeking new ways to connect with their friends on social media platforms. One way users try to connect with their friends is by discussing their past interactions. Finding such past interactions in order to engage in such a discussion involves manually searching through many messages the user exchanged with their friends. Such messages are typically scattered and disorganized, requiring a great deal of time and effort to find a message of interest.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
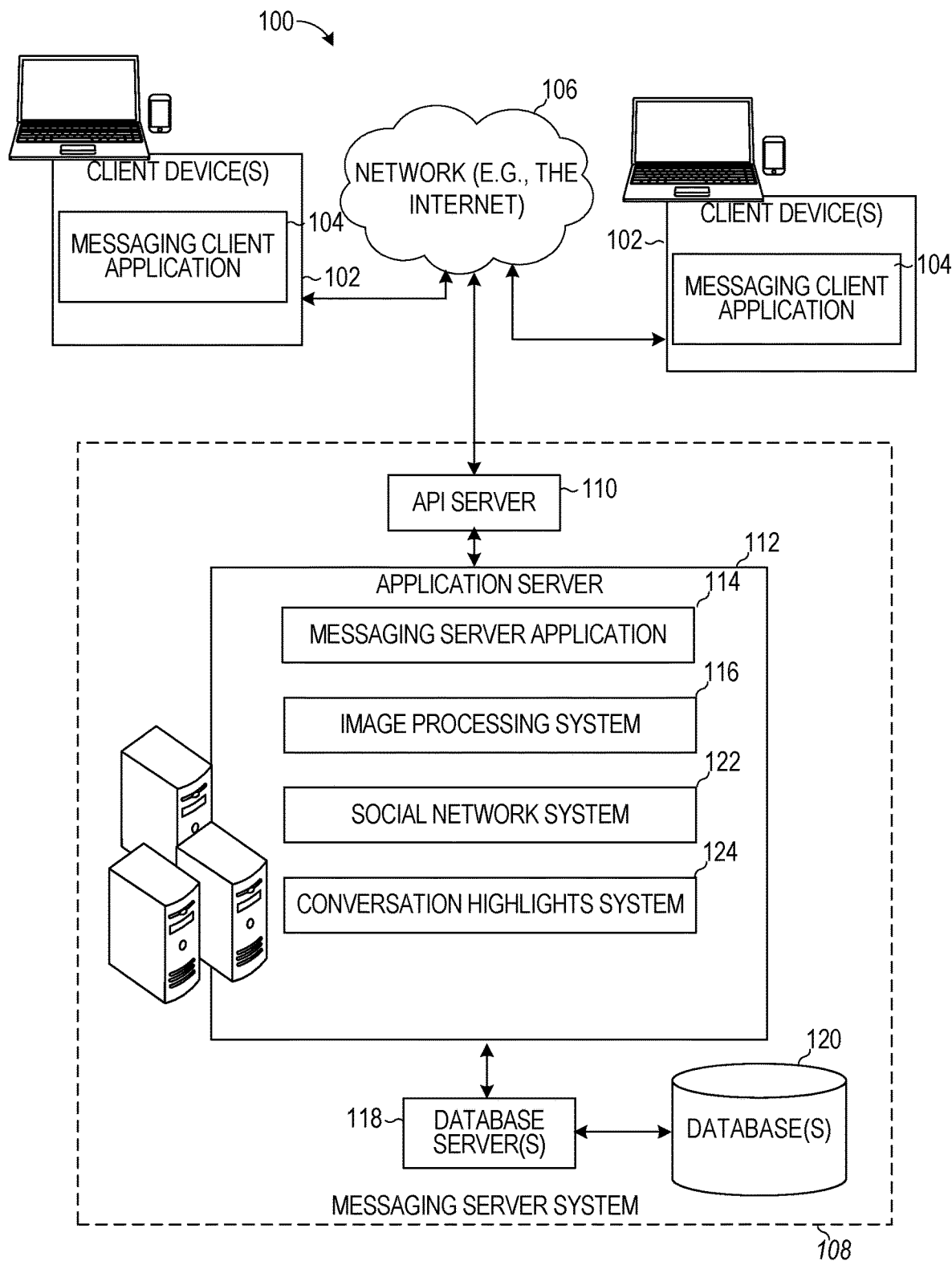
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical social media network platforms allow users to connect with one another through a chat screen. A given user is presented with a list of their friends and the user can pick and choose which of the friends the given user wants to communicate with. These social media network platforms typically save entire conversations the users have, including every single message that the users exchange. In certain cases, messages are discarded if they are over a certain age.

Sometimes users would like to revisit their prior conversations to engage in new interactions with their friends or reminisce about prior engagements. However, because all the messages and interactions are saved, finding the prior conversation the user is looking for requires a great deal of effort and time. This is because, to find a message in a prior conversation of interest, a given user has to manually search through hundreds of previous messages and, even then, the user may miss the message of interest. Thus, users typically do not undertake the effort needed to find the prior message of interest and miss out on precious opportunities to connect with their friends. This also makes saving such prior conversations pointless and a waste of storage and computational resources.

Some typical systems have limited the number of messages that are saved by only saving those messages in a conversation the user requests to save. However, such systems fail to meaningfully organize and present the prior saved messages. Thus, even in these systems, numerous messages may end up being saved by users, requiring the same daunting effort to find a message of interest.

The disclosed embodiments improve the efficiency of using the electronic device by automatically visually presenting to a user one or more messages from previous conversations that may be of interest to the user. Specifically, the disclosed embodiments store multiple conversation segments that include consecutive messages exchanged by a group of users. The consecutive messages included in the conversation segments are manually requested to be saved by one or more users in the group of users. In some embodiments, the disclosed techniques score the messages in each conversation segment based on one or more criteria. After the consecutive messages in a given conversation segment are scored, the disclosed embodiments select the given set of consecutive messages having a score that exceeds a threshold or having a greatest score among other consecutive messages.

After a specified time period has elapsed following the exchange of the given set of consecutive messages, an interactive visual indicator of the selected given set of consecutive messages is generated for display to a user in a graphical user interface. The indicator may inform the user that the given set of consecutive messages represents a conversation segment that took place previously between the users, such as earlier than the specified time period, and may be of interest to the user to revisit. In response to receiving a user selection of the interactive visual indicator, such as if the user taps a portion of the screen displaying the visual indicator, a portion of the messages in the set of consecutive messages is displayed in the graphical user interface allowing the user to revisit the earlier conversation and/or share portions of the conversation segment with the users in the group.

In some implementations, the criteria used to score messages in a given group include the number of words in a given set of consecutive messages, an amount of time elapsed between each message or collection of consecutive messages in the given set of messages, the number of messages in the set of consecutive messages, a frequency of message exchange of the set of consecutive messages, whether one or more messages in the given set of consecutive messages includes a graphic, avatar, image or video, how frequently a given user in the group of users requests to save messages in a conversation, and/or any other combination of suitable factors. In some implementations, the plurality of messages in a first of the plurality of conversation segments is searched to identify a group of consecutively exchanged messages for which a difference between a starting time stamp of a first message in the group of consecutive messages and an ending time stamp of a last message in the group of consecutive messages is less than a threshold time interval (e.g., less than 2 days) representing consecutively exchanged messages. This may indicate that the messages in this group of consecutive messages were exchanged within a specified span of time or frequently enough to be important. Namely, messages that are exchanged very quickly and very often within a short span of time (e.g., less than 5 minutes) may indicate an event that is of higher interest to the users engaged in the conversation than other events discussed in the conversation. Such a collection of consecutive messages is thereby scored relatively high to cause the collection of consecutive messages to be highlighted or identified to the user at a later time (e.g., one year after the message exchange took place).

In some embodiments, the portion of the messages in the set of consecutive messages is displayed in the graphical user interface in a full screen display screen of a client device. The graphical user interface may present the messages in the same way as they were presented when the conversation took place at the earlier time. Specifically, a first message in the group of consecutive messages is initially generated for display on the full screen display. After the first message is displayed, a first user input that taps on the display of the client device is received and, in response, a second message in the group of consecutive messages that consecutively follows the first message is generated for display on the full screen display of the client device simultaneously with the first message. Each of the group of consecutive messages continues to be sequentially displayed as each of a plurality of inputs that taps on the display of the client device is received.

By automatically presenting to a user the previously exchanged messages that are likely to be of interest to the user, the user is provided with an easy and efficient way to connect with their friends and reminisce about past events. Namely, with minimal user input, the user is informed about which conversation segments are of likely interest to the user. In this way, rather than paging through multiple screens of information and manually searching through hundreds of previously exchanged messages to find a conversation segment of interest, meaningful previously exchanged messages that are part of a conversation segment are presented to the user quickly and simply by displaying an interactive visual indicator of such messages in a graphical user interface and presenting portions of such messages in response the user tapping on the visual indicator.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104 and between a messaging client application 104 and the messaging server system 108 includes functions (e.g., commands to invoke functions) as well as payload data (e.g., text, audio, video, or other multimedia data).

The messaging client application 104 allows a group of two or more users to create a group profile. The group profile includes stored information that is common to the group. Such information includes images, videos, attachments, and messages the group of users exchanged with each other during one or more prior conversations. As referred to herein, a prior conversation is a previous interaction (e.g., an interaction that took place more than one day before the present time, such as one year ago) between two or more users that includes messages, text, images, graphics, avatars, animations, attachments, videos, and so forth. Each of the prior conversations may include all of the previous interactions that took place in a single day, such that all of the prior conversations represent a collection of conversations across multiple days. A conversation segment is any combination of the interaction between the two or more users that does not include all of the content of the conversation. For example, a conversation takes place during the course of one day and includes hundreds of messages exchanged by the two or more users during the course of the day. A conversation segment of the conversation may include a snippet of the conversation, such as only 4 or 5 out of the hundreds of messages that were exchanged during several minutes of the entire day.

In some embodiments, content is added to the group profile only in response to a specific request from one of the users in the group. For example, if the users in the group exchange hundreds of messages, then all of those messages, by default, will be automatically deleted and removed from storage after a specified time period (e.g., one hour, one minute, one second, etc.). If, prior to the specified time period when the messages are automatically deleted, any one of the users in the group selects one or more messages for permanent retention, the selected messages are added to the group profile. Such messages can be viewed by any one of the users in the group at any given time. Similarly, other content the users exchange in the messaging client application 104 with each other is automatically discarded after a given time period but can be added to the group profile by any one of the users to avoid deletion.

For example, input from a first user of the plurality of users is received to save one or more messages exchanged with the group of users, and in response to receiving the input, the one or more messages are added to the group profile. To add the messages to the group profile, a determination is made as to whether a conversation segment for the given date of the messages already exists for the group profile. Specifically, the messaging client application 104 determines whether a given one of a plurality of conversation segments that were previously stored corresponds to a same day on which the one or more messages that the first user selects to store were exchanged. In response to determining that the given one of the plurality of conversation segments corresponds to the same day as the date of the one or more messages the first user selects to store, the messaging client application 104 adds the one or more messages to the given one of the plurality of conversation segments. In response to determining that the given one of the plurality of conversation segments corresponds to a different day than the same day on which the one or more messages were exchanged, the messaging client application 104 generates a new conversation segment that includes the one or more messages the first user selects to store.

In some embodiments, the messaging client application 104 communicates with the conversation highlights system 124 to identify one or more interesting consecutive messages in various conversation segments that are included in the group profile. In an implementation, the messaging client application 104 identifies a different collection or group of consecutive messages for each conversation segment that is in the group profile. For example, if there are five conversation segments associated with five different days, the messaging client application 104 identifies five different groups of messages, one for each of the five different days. The group of consecutive messages for each conversation segment is identified by computing a score for several groups of messages in a given conversation segment and selecting the group in the given conversation segment with the highest score or with a score that exceeds a given threshold (e.g., a score of over 70). In some implementations, the score is computed based on one or more criteria including the number of words in a given set of consecutive messages, an amount of time elapsed between each message or collection of consecutive messages in the given set of messages, the number of messages in the set of consecutive messages, a frequency of message exchange of the set of consecutive messages, whether one or more messages in the given set of consecutive messages includes a graphic, avatar, image or video, how frequently a given user in the group of users requests to save messages in a conversation, and/or any other combination of suitable factors.

After a given group of consecutive messages is identified by the conversation highlights system 124, the messaging client application 104 presents an interactive visual indicator (e.g., an icon) that represents the group of messages. In some implementations, visual attributes of the icon may differ depending on the content of the group of messages. For example, the icon may include unreadable or readable text and graphics that summarize or shrink down the entire content of the group of consecutive messages. The user can tap the interactive visual indicator to access the group of consecutive messages. In some implementations, a full screen display is provided for presenting the group of messages. Each message in the group of consecutive messages is presented in the full screen display sequentially in response to a respective user input. For example, when the user taps on the screen one time, a first message of the group is displayed. When the user then taps on the screen again (a second time), the next message that sequentially follows the first message is simultaneously presented with the first message. When the last message in the group is displayed and the user taps on the screen again, the full screen display is closed and the previous screen (that was shown before the full screen display) is presented again.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the conversation highlights system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the conversation highlights system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114.

Figure 2:
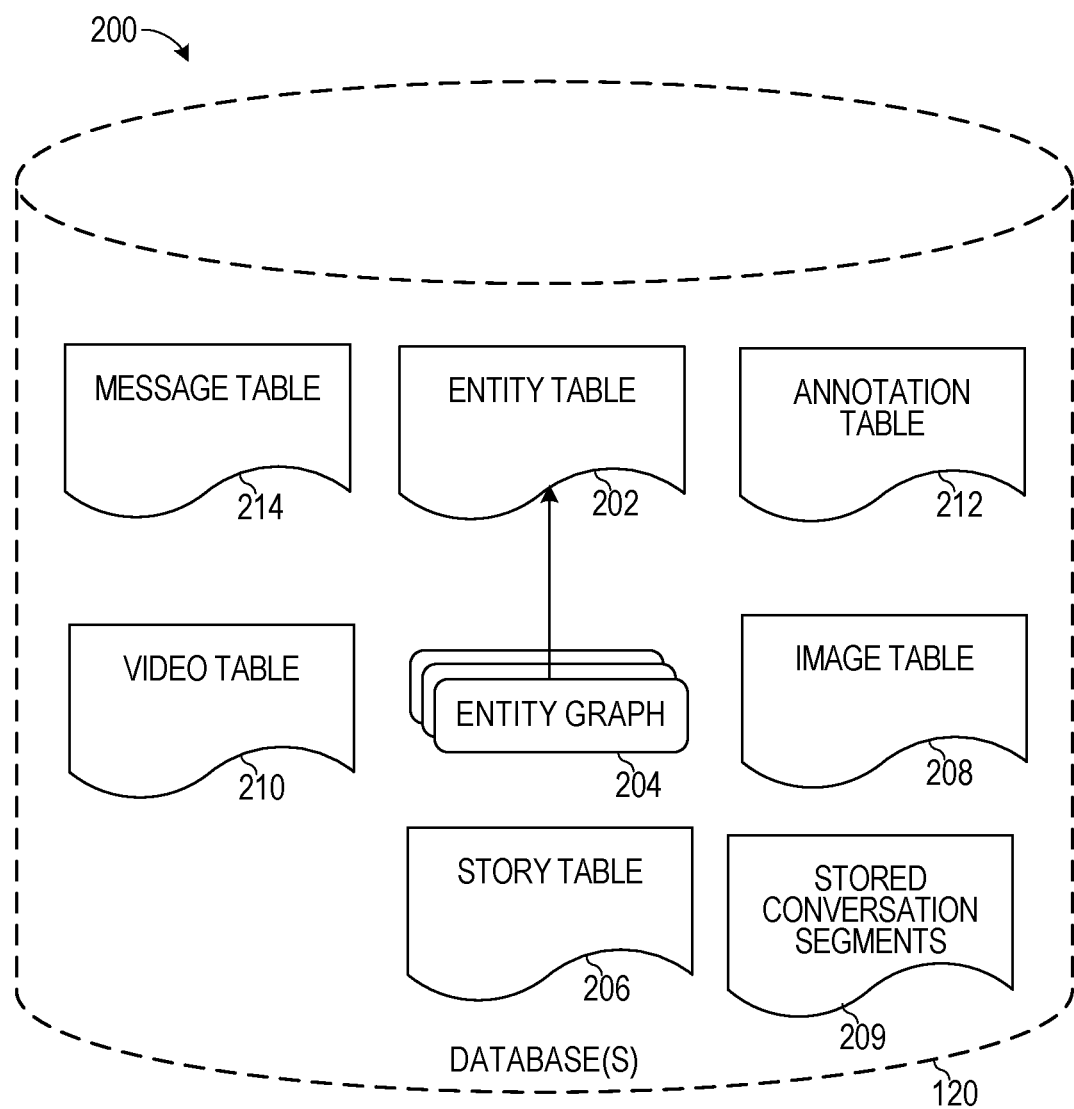
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

A message table 214 may store a collection of conversations between a user and one or more friends or entities. The message table 214 may include various attributes of each conversation, such as the list of participants, the size of the conversation (e.g., number of users and/or number of messages), the chat color of the conversation, a unique identifier for the conversation, and any other conversation related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

Stored conversation segments 209 may store one or more conversation segments for a group of users that the conversation highlights system 124 uses to identify a group of consecutive messages to highlight or indicate to a user in the messaging client application 104. For example, when a given user in a group of users provides input requesting to save selected one or more messages of the conversation that are exchanged with the group of users, a date and time stamp of each of the selected messages is retrieved and stored in the stored conversation segments 209. In some embodiments, a score generated by the conversation highlights system 124 is also stored in association with the messages in the stored conversation segments 209. In some embodiments, the messages stored in the stored conversation segments 209 are grouped according to dates or days. In this way, all of the messages that were requested to be added to the group profile by a given user in the group and that were exchanged on the same day or date are grouped together to form one conversation segment. In some embodiments, stored conversation segments 209 stores characteristics of each user in the group of users. The characteristics may include how frequently the given user in the group of users saves messages or adds messages to the group profile relative to other users in the group or other users of the messaging client application 104.

The characteristics may include how frequently the given user in the group of users contributes or sends messages to other users in the group. A given user that does not send many messages and requests to save a given message may be indicative that the given message is more important to the given user than other messages. This may result in an increased score for the given message being generated to increase the likelihood that an interactive visual indicator of such a message, allowing the given user to view the message at some time in the future, is included in the graphical user interface.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
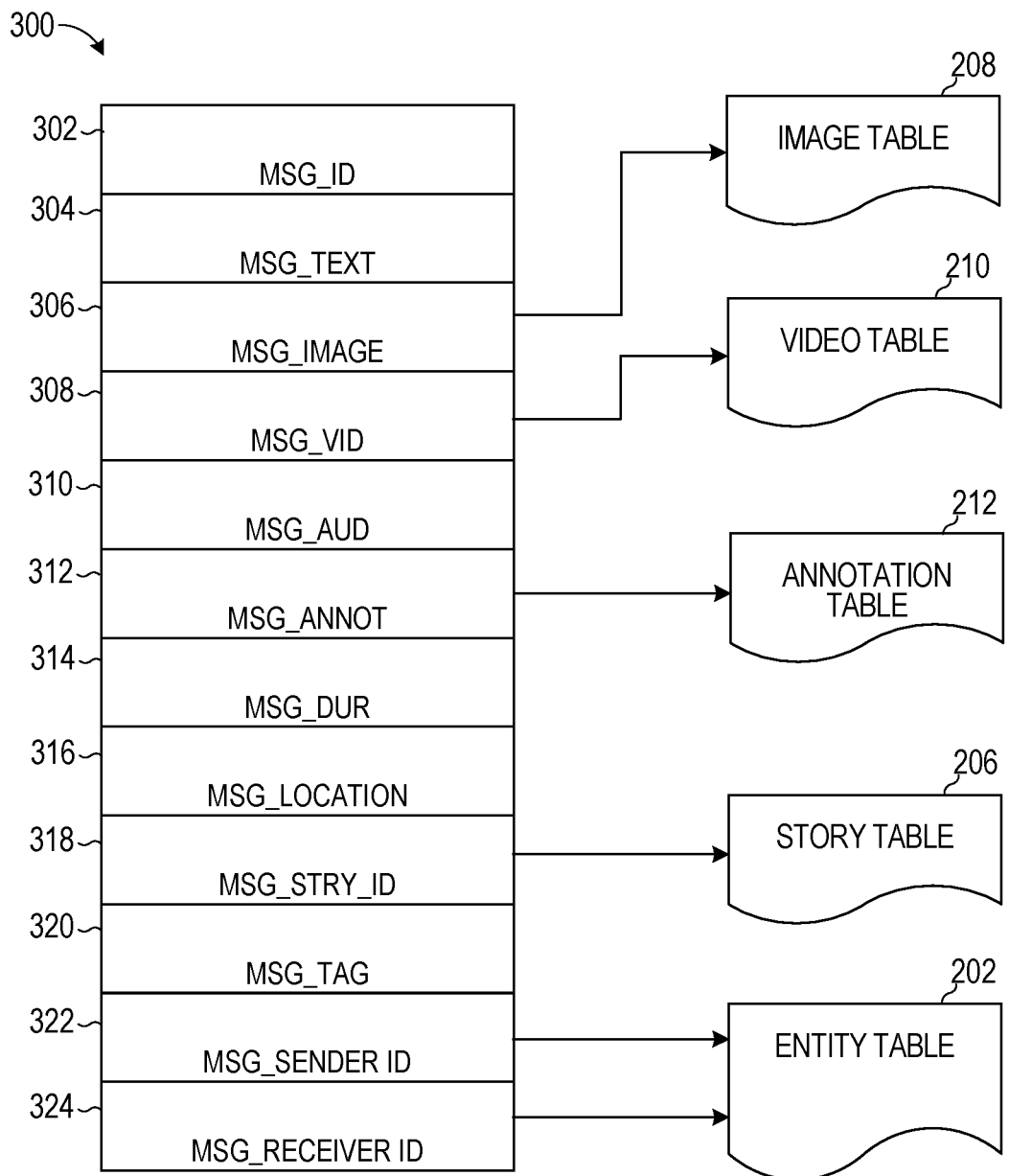
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
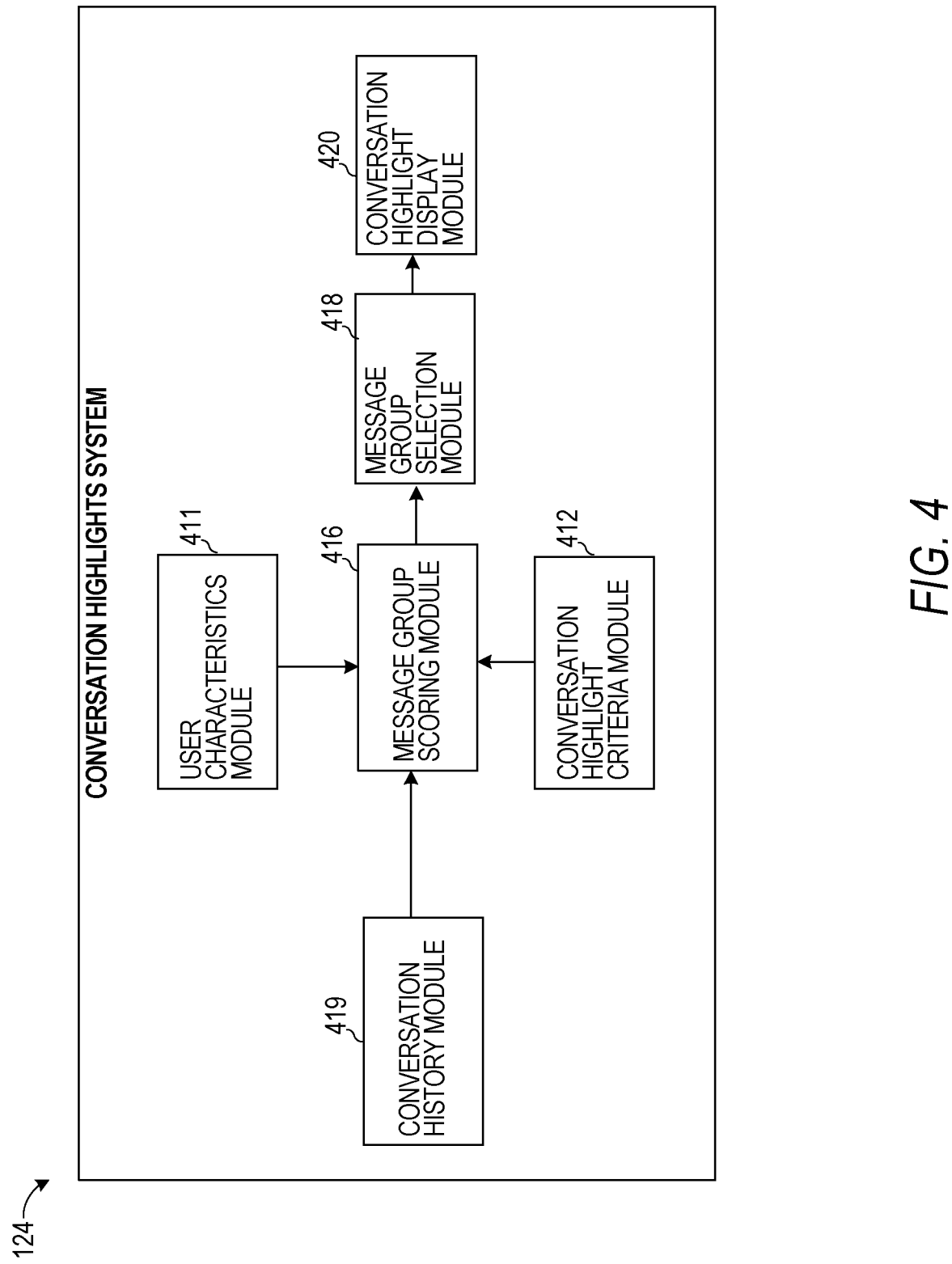
FIG. 4 is a block diagram showing an example conversation highlights system, according to example embodiments.

FIG. 4 is a block diagram showing an example conversation highlights system 124, according to example embodiments. Conversation highlights system 124 includes a conversation history module 419, a user characteristics module 411, a message group scoring module 416, a conversation highlight criteria module 412, a message group selection module 418, and a conversation highlight display module 420. Conversation history module 419 accesses stored conversation segments 209 to retrieve a plurality of conversation segments for a group profile for a plurality of users. Specifically, the conversation history module 419 may retrieve a group profile identifier for a given group profile for the plurality of users. The conversation history module 419 searches the conversation segments 209, based on the group profile identifier, to retrieve a first conversation segment that includes a plurality of messages that were exchanged between the plurality of users on a first date and saved by one or more of the users before the messages were automatically deleted. The conversation history module 419 retrieves a second conversation segment that includes a plurality of messages that were exchanged between the plurality of users on a second date and saved by one or more of the users before the messages were automatically deleted.

The conversation history module 419 provides the first and second conversation segments that each includes the plurality of messages to the message group scoring module 416. The message group scoring module 416 obtains one or more criteria from the conversation highlight criteria module 412 and uses the obtained one or more criteria to generate a score for each message or collection of messages in each of the first and second conversation segments. The one or more criteria may include number of words in a given set of consecutive messages, an amount of time elapsed between each message or collection of consecutive messages in the given set of messages, the number of messages in the set of consecutive messages, a frequency of message exchange of the set of consecutive messages, whether one or more messages in the given set of consecutive messages includes a graphic, avatar, image or video, how frequently a given user in the group of users requests to save messages in a conversation, and/or any other combination of suitable factors. In some embodiments, the message group scoring module 416 retrieves user characteristics from the user characteristics module 411 to adjust the scores assigned to each message or collection of messages.

For example, the message group scoring module 416 retrieves time stamps of each message in the first conversation segment. The message group scoring module 416 compares the time stamp of the first message in the first conversation segment with the time stamp of the last message in the first conversation segment. If the difference between the two time stamps exceeds a specified time period (e.g., 2 hours), the message group scoring module 416 divides the messages in the first conversation segment into a plurality of collections of messages. Specifically, the message group scoring module 416 may generate the plurality of collections of messages in which each collection has messages where a difference in time between a first message and a last message in the collection is less than the specified time period (e.g., 2 hours).

In some embodiments, the message group scoring module 416 scores each collection of messages based on one or more combination of factors. For example, the message group scoring module 416 scores the collection of messages based on number of words in each message in the collection. If the number of words in a given message in the collection is less than a specified amount (e.g., less than three words), the message group scoring module 416 assigns a low score (e.g., 10) to the collection or decreases the currently assigned score by a specified number (e.g., 25). As the number of words (or word count) in the given messages in the collection increases, the score assigned to the collection also increases.

In some embodiments, the message group scoring module 416 determines whether a difference in each time stamp of each message in the collection is less than a specified amount to set or adjust the score assigned to the collection. For example, if each message in the collection is exchanged within less than one minute of another message, the message group scoring module 416 assigns a high score (e.g., 80) to the collection or increases the currently assigned score by a specified number (e.g., 25). On the other hand, if each message in the collection is exchanged within more than 5 minutes of another message, the message group scoring module 416 assigns a low score (e.g., 40) to the collection or decreases the currently assigned score by a specified number (e.g., 25). In some embodiments, the specified amount may be increased or decreased based on a characteristic of one or more users in the group. For example, if a given user in the group frequently saves messages or frequently sends messages to the group, the specified amount may be reduced. If a given user in the group does not frequently save messages or does not frequently send messages to the group, the specified amount may be increased. This way, if a user frequently sends messages or frequently saves messages, the likelihood or score of a collection of messages associated with that user is increased only if the messages are sent more quickly and frequently than normally done by that user. Specifically, the calculation of the score may be based at least in part on intervals between consecutive messages. For example, the score may increase as the interval between consecutive messages decreases.

In some embodiments, the message group scoring module 416 determines whether a difference in time stamps of a first message in the collection and a last message in the collection is less than a specified amount to set or adjust the score assigned to the collection. For example, if all of the messages in the collection are exchanged within less than 10 minutes of each other, the message group scoring module 416 assigns a high score (e.g., 90) to the collection or increases the currently assigned score by a specified number (e.g., 25). On the other hand, if all the messages in the collection are exchanged more than 10 minutes from each other, the message group scoring module 416 assigns a low score (e.g., 25) to the collection or decreases the currently assigned score by a specified number (e.g., 25). Specifically, the calculation of the score may be based at least in part on an interval of time between a selected set of messages, such as the interval between the first message and the last message in the collection. For example, the score may increase as the interval decreases.

In some embodiments, the message group scoring module 416 determines whether a total number of messages in the collection is greater than a specified amount to set or adjust the score assigned to the collection. For example, if there are more than 20 messages in the collection, the message group scoring module 416 assigns a high score (e.g., 70) to the collection or increases the currently assigned score by a specified number (e.g., 25). On the other hand, if there are fewer than 20 messages in the collection, the message group scoring module 416 assigns a low score (e.g., 25) to the collection or decreases the currently assigned score by a specified number (e.g., 25). For example, the score may increase as the total number of consecutive messages increases.

In some embodiments, the message group scoring module 416 determines whether one or more graphics, avatars, images, media, or videos are included in the collection of messages to set or adjust the score assigned to the collection. For example, if the collection includes one or more graphics, avatars, images, media or videos, the message group scoring module 416 assigns a high score (e.g., 90) to the collection or increases the currently assigned score by a specified number (e.g., 25). On the other hand, if there are no graphics, avatars, images, media or videos (or if there are less than a threshold number of graphics (e.g., less than 3 graphics per every 10 messages), avatars, images, media or videos) in the collection of messages, the message group scoring module 416 assigns a low score (e.g., 25) to the collection or decreases the currently assigned score by a specified number (e.g., 25). For example, the score may increase as the amount of graphics, avatars, images, media, or videos in the consecutive messages increase.

Any one or more of the scoring mechanisms discussed above and below can be used in combination or independently and exclusively. For example, a score for the collection of messages can be computed based on whether a total number of messages in the collection is greater than a specified amount and based on an interval of time between a selected set of messages. The total score for a given collection of messages can be computed based on a weighted sum of scores computed based on each scoring mechanism. For example, first score can be generated based on whether a total number of messages in the collection is greater than a specified amount (e.g., the first score can be computed as 60 if there are greater than ten messages in the collection). A first weight can be associated with the score generated based on the total number of messages (e.g., a weight of 0.3). A second score can be generated based on an interval of time between selected messages in the collection of messages (e.g., the second score can be computed as 70 if the interval of time is less than 2 minutes between all the selected messages or 30 seconds between two individual messages in the collection). A second weight can be associated with the score generated based on the interval of time between selected messages (e.g., a weight of 0.7). The total score for the collection can be computed as a function of the scores and their associated weights (e.g., the total score=0.3*60+0.7*70). Namely, the total score can be equal to the sum of the first weight multiplied by the associated first score and the second weight multiplied by the associated second score.

The scored messages are provided by the message group scoring module 416 to the message group selection module 418. The message group selection module 418 obtains the scores computed for the collection of messages of the first conversation segment. The message group selection module 418 determines which collection of messages has the greatest score by comparing the computed scores of each of the collection of messages in the first conversation segment to select a group of messages to provide to the conversation highlight display module 420. In some implementations, the message group selection module 418 compares the scores of each of the collection of messages to a threshold (e.g., a value of 70) to select the group of messages. For example, the first conversation segment includes a first collection of messages that were exchanged in the morning between 9-11 AM and a second collection of messages that were exchanged in the evening between 8-11 PM. The first collection of messages may have a score of 90/100 computed by the message group scoring module 416 and the second collection of messages may have a score of 52/100 computed by the message group scoring module 416. In such circumstances, the message group selection module 418 selects the first collection of messages of the first conversation segment to provide to conversation highlight display module 420 and discards the second collection of messages.

For example, message group selection module 418 identifies a plurality of groups of consecutively exchanged messages that respectively exceed a word count threshold (e.g., more than three words) and selects one of the plurality of groups as the identified group for display based on a preference criterion. As another example, message group selection module 418 identifies in the first conversation segment a most recent group of consecutive messages that exceeds a word count threshold (e.g., more than three words) and selects the most recent group that exceeds the word count threshold as the identified group for display based on a preference criterion. As another example, message group selection module 418 identifies a plurality of groups of consecutively exchanged messages that respectively exceed a minimum number of messages (e.g., a minimum of 5 messages) and selects one of the plurality of groups as the identified group for display based on a preference criterion.

Similarly, message group selection module 418 obtains the scores computed for the collection of messages of the second conversation segment. The message group selection module 418 determines which collection of messages has the greatest score by comparing the computed scores of each of the collection of messages in the second conversation segment to select a group of messages to provide to the conversation highlight display module 420. For example, the second conversation segment includes a third collection of messages that were exchanged in the afternoon between 1-3 PM and a fourth collection of messages that were exchanged in the evening between 7-8 PM. The first collection of messages may have a score of 30/100 computed by the message group scoring module 416 and the second collection of messages may have a score of 80/100 computed by the message group scoring module 416. In such circumstances, the message group selection module 418 selects the second collection of messages of the second conversation segment to provide to conversation highlight display module 420 and discards the first collection of messages.

The conversation highlight display module 420 generates an interactive visual indicator for each collection of messages it receives from the message group selection module 418. In some implementations, the conversation highlight display module 420 sorts the interactive visual indicators that are generated based on a date associated with the collection of messages of the interactive visual indicator. In this way, visual indicators can be presented on a graphical user interface in chronological or reverse chronological order based on the dates on which the corresponding collection of messages were previously exchanged. As discussed in connection with FIG. 7, the conversation highlight display module 420 generates a graphical user interface that includes a plurality of portions. A first of the plurality of portions displays one or more images or videos saved by one or more of the plurality of users and includes a first selectable option to view all of the images or videos saved by the one or more of the plurality of users. A second of the plurality of portions displays the interactive visual representation or indicator generated by the conversation highlight display module 420 for each collection of messages and includes a second selectable option to view additional groups of consecutively exchanged messages. A third of the plurality of portions displays attachments exchanged between the plurality of users and a fourth of the plurality of portions displays a communication interface to generate a new message to exchange with the plurality of users.

Figure 5:
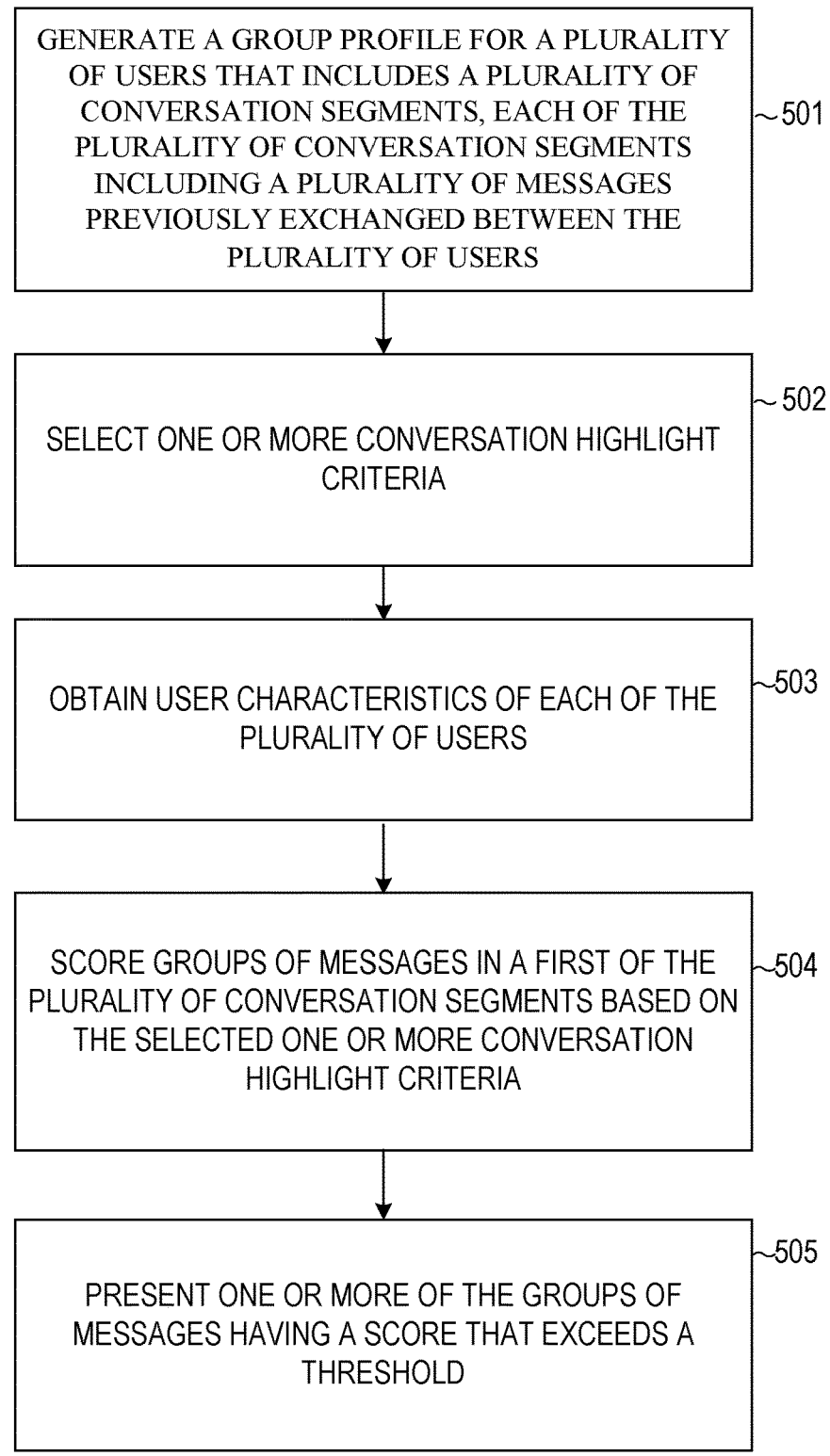
FIGS. 5 and 6 are flowcharts illustrating example operations of the conversation highlights system, according to example embodiments.

FIG. 5 is a flowchart illustrating example operations of the conversation highlights system 124 in performing process 500, according to example embodiments. The process 500 may be embodied in computer-readable instructions for execution by one or more processors such that the operations of the process 500 may be performed in part or in whole by the functional components of the messaging server system 108 and/or messaging client application 104; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the conversation highlights system 124 generates a group profile for a plurality of users that includes a plurality of conversation segments, each of the plurality of conversation segments including a plurality of messages previously exchanged between the plurality of users. For example, the conversation history module 419 accesses stored conversation segments 209 to retrieve a group profile that includes previously stored conversation segments for a plurality of users associated with the group profile.

At operation 502, the conversation highlights system 124 selects one or more conversation highlight criteria. For example, the message group scoring module 416 retrieves one or more factors from conversation highlight criteria module 412 and uses the factors to score conversation segments provided by the conversation history module 419. In some implementations, a default criterion or set of criteria is applied invariably to score the conversation segments.

At operation 503, the conversation highlights system 124 obtains user characteristics of each of the plurality of users. For example, the message group scoring module 416 obtains user characteristics of users associated with the group profile from user characteristics module 411.

At operation 504, the conversation highlights system 124 scores groups of messages in a first of the plurality of conversation segments based on the selected one or more conversation highlight criteria. For example, the message group scoring module 416 computes a score for collections of messages in the conversation segment using the one or more factors and/or user characteristics.

At operation 505, the conversation highlights system 124 presents one or more of the groups of messages having a score that exceeds a threshold. For example, the message group selection module 418 compares the scores assigned and computed for various collections of messages in the conversation segments and selects a collection with a highest score or having a score that exceeds a specified amount. This selected collection is provided to conversation highlight display module 420 to generate an interactive visual indicator for presentation in a graphical user interface to a user.

Figure 6:
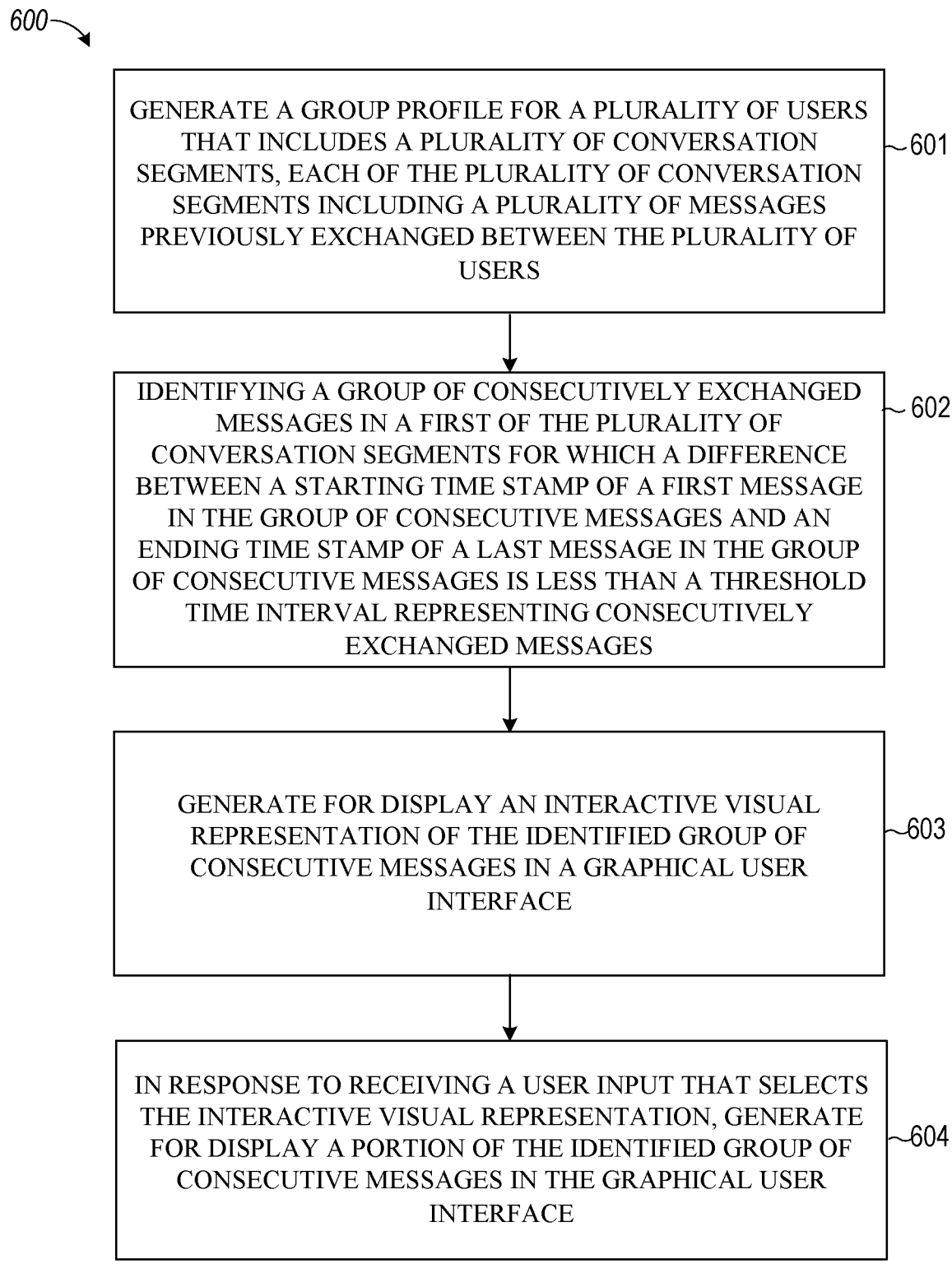

FIG. 6 is a flowchart illustrating example operations of the conversation highlights system 124 in performing a process 600, according to example embodiments. The process 600 may be embodied in computer-readable instructions for execution by one or more processors such that the operations of the process 600 may be performed in part or in whole by the functional components of the messaging server system 108 and/or messaging client application 104; accordingly, the process 600 is described below by way of example with reference thereto. However, in other embodiments, at least some of the operations of the process 600 may be deployed on various other hardware configurations. The process 600 is therefore not intended to be limited to the messaging server system 108 and can be implemented in whole, or in part, by any other component. Some or all of the operations of process 600 can be in parallel, out of order, or entirely omitted.

At operation 601, the conversation highlights system 124 generates a group profile for a plurality of users that includes a plurality of conversation segments, each of the plurality of conversation segments including a plurality of messages previously exchanged between the plurality of users. For example, the conversation history module 419 accesses stored conversation segments 209 to retrieve a group profile that includes previously stored conversation segments for a plurality of users associated with the group profile.

At operation 602, the conversation highlights system 124 identifies a group of consecutively exchanged messages in a first of the plurality of conversation segments for which a difference between a starting time stamp of a first message in the group of consecutive messages and an ending time stamp of a last message in the group of consecutive messages is less than a threshold time interval (e.g., less than 2 days) representing consecutively exchanged messages. For example, the message group scoring module 416 operates in conjunction with the message group selection module 418 to search and identify a collection of messages in a conversation segment that includes consecutively exchanged messages for which a difference between a starting time stamp of a first message in the group of consecutive messages and an ending time stamp of a last message in the group of consecutive messages is less than a threshold time interval, such as less than 2 days.

At operation 603, the conversation highlights system 124 generates for display an interactive visual representation of the identified group of consecutive messages in a graphical user interface. For example, an identified collection of messages is provided to conversation highlight display module 420 to generate an interactive visual indicator for presentation in a graphical user interface to a user.

At operation 604, the conversation highlights system 124, in response to receiving a user input that selects the interactive visual representation, generates for display a portion of the identified group of consecutive messages in the graphical user interface. For example, the conversation highlight display module 420 detects that a user taps on the interactive visual representation and in response presents a full screen display that includes the messages in the collection of messages of the conversation segment.

Figure 7:
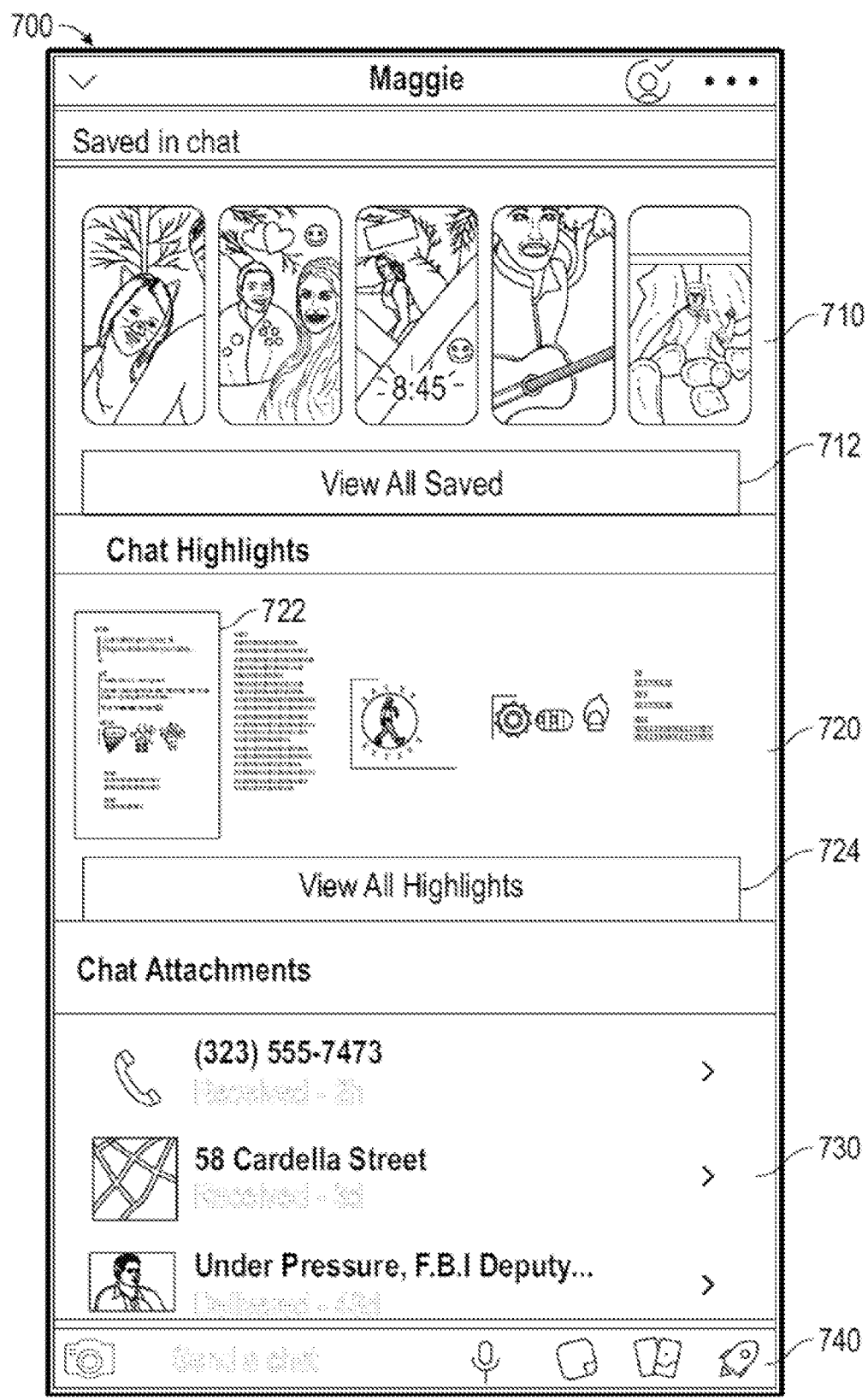
FIGS. 7 and 8 are illustrative inputs and outputs of the conversation highlights system, according to example embodiments.
Figure 8:
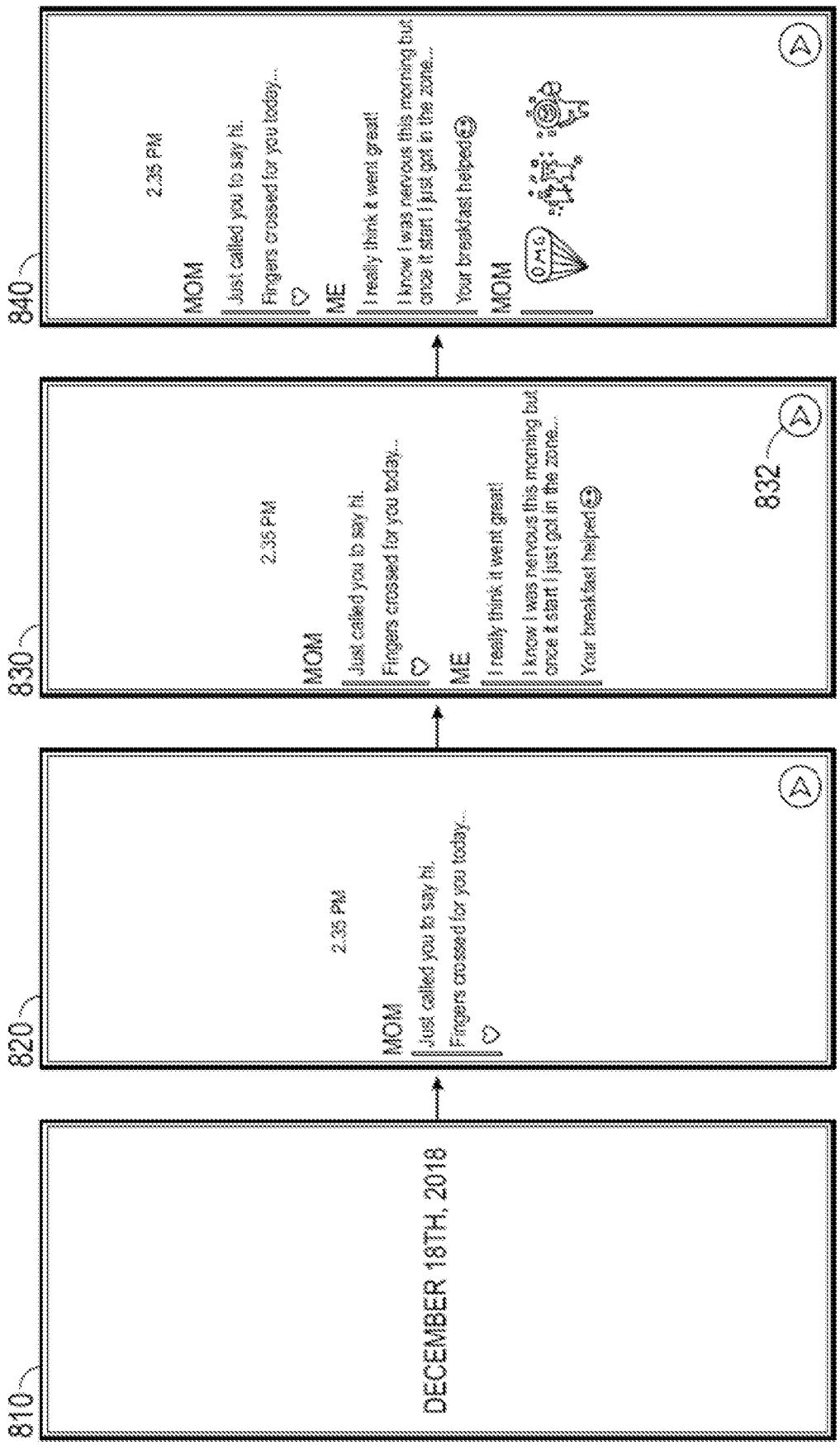

FIGS. 7 and 8 show illustrative inputs and outputs of the conversation highlights system 124, according to example embodiments. The inputs and outputs shown in FIGS. 7 and 8 can be implemented by the messaging client application 104. Screen 700 shown in FIG. 7 is presented by the messaging client application 104 in response a receiving a user request to access a group profile. In response to that request, the messaging client application 104 obtains common data which a plurality of users in a group previously shared and saved including messages, media, videos, images, and attachments.

In some embodiments, screen 700 includes a plurality of portions. A first portion 710 displays one or more images or videos saved by one or more of the plurality of users in the group and includes a first selectable option 712 to view all of the images or videos saved by the one or more of the plurality of users. The user can tap or select any of the images or videos displayed in the first portion 710 to enlarge the image or video and/or share the image or video with another user, such as one or more other users in the group.

A second portion 720 displays a plurality of interactive visual representations or indicators each representing a collection of messages of a conversation segment identified by the conversation highlights system 124. The second portion 720 includes a second selectable option 724 to view additional groups of consecutively exchanged messages.

The interactive visual representations or indicators may be arranged and sorted in the second portion 720 according to dates associated with the messages the indicators represent. In some implementations, the interactive visual representations or indicators are arranged in chronological order or reverse chronological order. For example, the first interactive visual representation or indicator 722 all the way on the left, or that is first in the list, may represent a collection of messages exchanged on a first date, and the last interactive visual representations or indicator all the way on the right, or that is last in the list, may represent a collection of messages exchanged on a second date that is several months following the first date.

Each of the plurality of interactive visual representations or indicators in the second portion 720 may have different visual attributes or a different look and feel. The visual attribute of each of the plurality of interactive visual representations or indicators may be based on the content of the messages associated with the interactive visual representation or indicator. For example, if the messages represented by the interactive visual representation or indicator have a certain score that exceeds a given threshold and/or have been exchanged within a certain very short time period (e.g., 15 messages in less than 3 minutes), the interactive visual representation may have a red border or red color. If the messages represented by the interactive visual representation or indicator have a certain score that does not exceed the given threshold and/or have been exchanged over a long time period (e.g., 3 messages in more than 1 hour), the interactive visual representation may have a yellow border or yellow color. In some embodiments, each interactive visual representation may display a summary of the contents of the collection of messages (e.g., a subset of all the messages in the collection of messages associated with the interactive visual representation) of the conversation segment associated with the interactive visual representation. The summary may include graphics and/or images exchanged in the collection of messages. The summary may be readable or unreadable depending on the number of messages included in the collection of messages.

A third portion 730 displays attachments exchanged between the plurality of users, and a fourth portion 740 displays a communication interface to generate a new message to exchange with the plurality of users. For example, the user may type in a message in the fourth portion 740 and select an option to send the message to the plurality of users associated with the group profile.

FIG. 8 shows a sequence of screens that are presented to a given user to view a group or collection of messages previously exchanged by a plurality of users. Specifically, the user may tap or select the first interactive visual indicator 722 associated with a collection of previously exchanged messages stored in the group profile. The collection of previously exchanged messages corresponds to the collection of messages in a conversation segment that are associated with a score that exceeds a given threshold (e.g., a score greater than 70) or that are associated with a score that is greater than a score of other collections of messages in the conversation segment. In response to the user tapping on the interactive visual indicator 722, the messaging client application 104 presents a first screen 810 in the graphical user interface in a full screen display. The first screen 810 presents the date on which the collection of messages associated with the interactive visual indicator 722 were exchanged.

In response to the user tapping anywhere on the first screen 810, the messaging client application 104 presents a second screen 820 in the graphical user interface in a full screen display. The second screen 820 presents a first message in the collection of messages of the conversation segment. In response to the user tapping anywhere on the second screen 820, the messaging client application 104 presents a third screen 830 in the graphical user interface in a full screen display. The third screen 830 presents a second message in the collection of messages of the conversation that follows sequentially and consecutively the first message. The second message is presented underneath and simultaneously with the first message. The first message is shifted up in the display to make room and display the second message in screen 830. The user can continue tapping anywhere on the screen 830 to retrieve additional messages sequentially and consecutively in the collection of messages. Each time the user taps, the next sequential and consecutive message is retrieved and displayed together with the other messages that were previously retrieved and displayed. Also, the messages are scrolled up to make room for the newly retrieved message. For example, as shown in screen 840, the user taps on the screen 840 to retrieve and display a third message.

The full screen display screens 820, 830 and 840 include a share option 832. A user can tap or select the share option 832 to send one or more messages that are presented in the screens 820, 830 and 840 to one or more other users. For example, the user can select the share option 832 to automatically send all the messages or a selected subset of the messages in the collection of messages that are presented to the user to the plurality of users associated with the group profile.

Once all of the messages are retrieved and displayed that are in the collection of consecutive messages, the next time the user taps on the screen the messaging client application 104 closes and exits the full screen display and navigates the user back to screen 700 in which the interactive visual indicator 722 was displayed. The user can select another visual indicator from the second portion 720 to retrieve and display in the full screen display messages from another collection of messages from another date and from another conversation segment.

Figure 9:
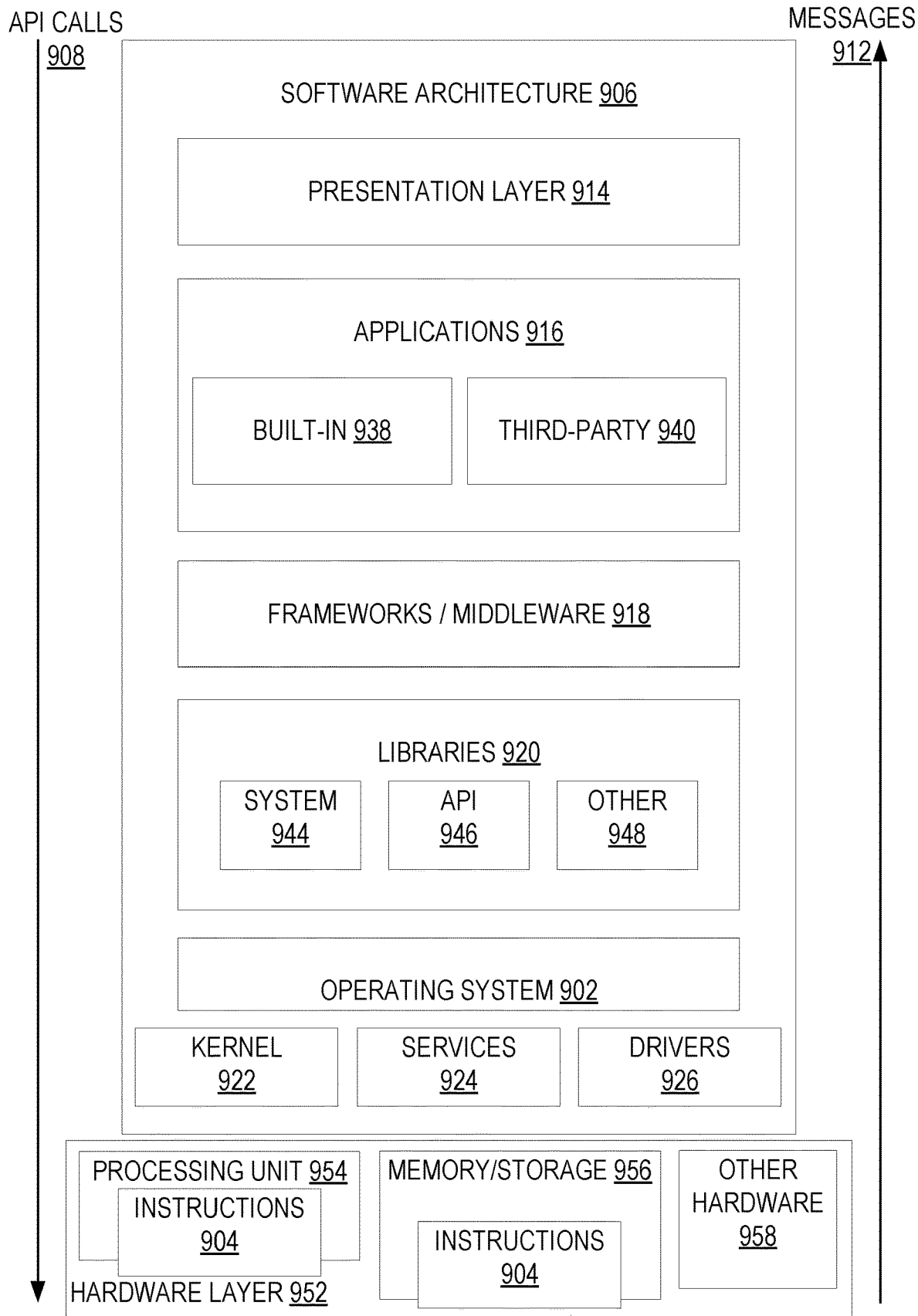
FIG. 9 is a block diagram illustrating a representative software architecture, which may be used in conjunction with various hardware architectures herein described, according to example embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and input/output (I/O) components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components, and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, frameworks/middleware 918, applications 916, and a presentation layer 914. Operationally, the applications 916 and/or other components within the layers may invoke API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924, and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic UI (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built-in operating system functions (e.g., kernel 922, services 924, and/or drivers 926), libraries 920, and frameworks/middleware 918 to create UIs to interact with users of the system. Alternatively, or additionally, in some systems, interactions with a user may occur through a presentation layer, such as presentation layer 914. In these systems, the application/component "logic" can be separated from the aspects of the application/component that interact with a user.

Figure 10:
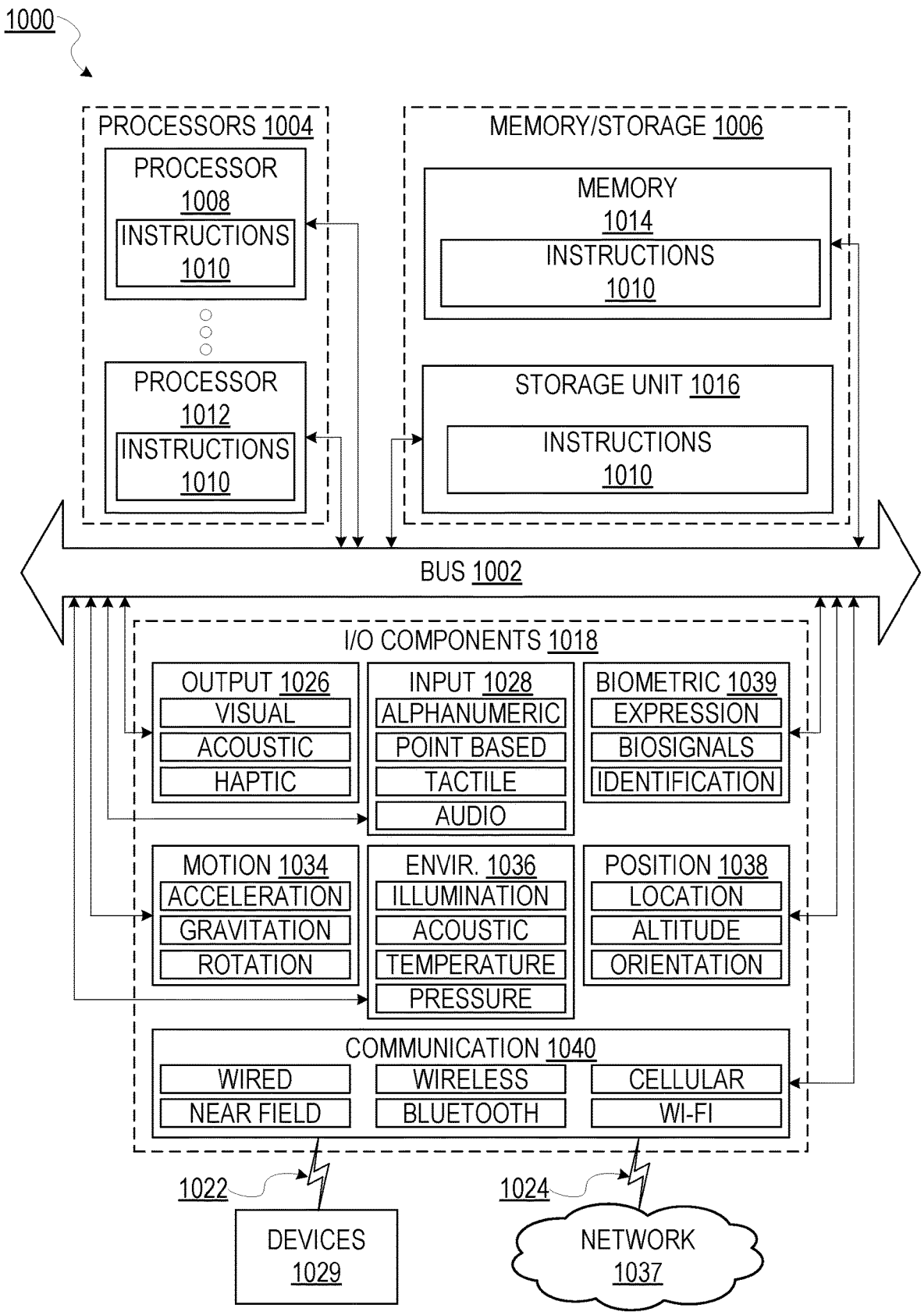
FIG. 10 is a block diagram illustrating components of a machine able to read instructions from a machine-readable medium (e.g., a machine-readable storage medium) and perform any one or more of the methodologies discussed herein, according to example embodiments.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory/storage 1006, and I/O components 1018, which may be configured to communicate with each other such as via a bus 1002. In an example embodiment, the processors 1004 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1008 and a processor 1012 that may execute the instructions 1010. The term "processor" is intended to include multi-core processors 1004 that may comprise two or more independent processors (sometimes referred to as "cores") that may execute instructions contemporaneously. Although FIG. 10 shows multiple processors 1004, the machine 1000 may include a single processor with a single core, a single processor with multiple cores (e.g., a multi-core processor), multiple processors with a single core, multiple processors with multiple cores, or any combination thereof.

The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1039, motion components 1034, environmental components 1036, or position components 1038 among a wide array of other components. For example, the biometric components 1039 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environmental components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1037 or devices 1029 via coupling 1024 and coupling 1022, respectively. For example, the communication components 1040 may include a network interface component or other suitable device to interface with the network 1037. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1029 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code,", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   establishing a conversation session between a plurality of users in which a plurality of messages are exchanged between the plurality of users;
   after a given message of the plurality of messages is exchanged, receiving input from a first user of the plurality of users to add the given message to a group profile to permanently retain the given message and avoid automatic deletion of the given message;
   in response to receiving the input from the first user, determining that the first user adds more than a threshold number of messages to the group profile, each of the threshold number of messages being added to the group profile in response to being selected by one of the users after being exchanged to be included in the group profile allowing the plurality of users to view past messages exchanged in the conversation session;
   in response to determining that the first user adds more than the threshold number of messages to the group profile, setting a threshold time interval to a first value, the threshold time interval controlling generation of conversation segments; and
   identifying a group of consecutively exchanged messages in a first of a plurality of conversation segments in the group profile for which a difference between a starting time stamp of a first message in the group of consecutively exchanged messages and an ending time stamp of a last message in the group of consecutively exchanged messages is less than the threshold time interval.

2. The method of claim 1, further comprising:
   generating for display an interactive visual representation of the identified group of consecutively exchanged messages in a graphical user interface; and
   in response to receiving selection of the interactive visual representation, generating for display a portion of the identified group of consecutively exchanged messages in the graphical user interface:
   generating for display a first screen that presents a date on which the identified group of consecutively exchanged messages were exchanged;

in response to detecting a first touch input, generating for display a second screen that presents the first message of the group of consecutively exchanged messages; and
after the second screen is presented, in response to detecting a second touch input, generating for display a third screen that presents a second message of the group of consecutively exchanged messages together with the first message.

3. The method of claim 2, wherein the first and second touch inputs are configured for detection within any region of the first screen or the second screen configured for touch input.

4. The method of claim 1, further comprising:
sequentially displaying messages of the group of consecutively exchanged messages as each of a plurality of inputs, via taps on a display of a client device, is received;
displaying a last message in the group in response to receiving a given one of the plurality of inputs together with the group of consecutively exchanged messages; and
exiting a full screen display that includes the group of consecutively exchanged messages in response to receiving a final user input, via taps on the display of the client device, following the given one of the plurality of inputs.

5. The method of claim 4, further comprising generating for display in the full screen display of the client device an interactive option to share one or more of the messages presented on the full screen display with the plurality of users.

6. The method of claim 1, wherein the conversation session configured to automatically delete a given message of the plurality of messages after a specified time period, the method further comprising:
generating the group profile for the plurality of users that includes the plurality of conversation segments, each of the plurality of conversation segments including a plurality of messages previously exchanged between the plurality of users, the given message being added to the group profile in response to receiving the input from the first user.

7. The method of claim 1, wherein a first conversation segment includes a plurality of previously exchanged messages on a first day, wherein a second conversation segment includes a plurality of previously exchanged messages on a second day that follows the first day, and wherein the first conversation segment includes less than all of the messages exchanged between the plurality of users on the first day and the second conversation segment includes less than all of the messages exchanged between the plurality of users on the second day.

8. The method of claim 1, further comprising:
generating for display simultaneously first and second interactive visual representations of respective first and second groups of consecutively exchanged messages in a graphical user interface, wherein:
the first interactive visual representation includes a first visual property based on content of the first group of consecutively exchanged messages; and
the second interactive visual representation includes a second visual property based on content of the second group of consecutively exchanged messages.

9. The method of claim 1, further comprising:
determining whether a given one of the plurality of conversation segments corresponds to a same day on which the given message was exchanged;

in response to determining that the given one of the plurality of conversation segments corresponds to the same day, adding the given message to the given one of the plurality of conversation segments; and
in response to determining that the given one of the plurality of conversation segments corresponds to a different day than the same day on which the given message was exchanged, generating a new conversation segment that includes the given message.

10. The method of claim 1, further comprising:
displaying, in a first of portion of a display, one or more images or videos saved by one or more of the plurality of users, the first portion including a first selectable option to view all of the images or videos saved by the one or more of the plurality of users;
displaying, in a second portion of the display, an interactive visual representation of the group of consecutively exchanged messages, the second portion including a second selectable option to view additional groups of consecutively exchanged messages;
displaying, in a third portion of the display, attachments exchanged between the plurality of users; and
displaying, in a fourth portion of the display, a communication interface to generate a new message to exchange with the plurality of users.

11. The method of claim 1 further comprising:
identifying a plurality of groups of consecutively exchanged messages that respectively exceed a word count threshold; and
selecting one of the identified plurality of groups for display.

12. The method of claim 1 further comprising:
identifying a plurality of groups of consecutively exchanged messages that respectively exceed a minimum number of messages; and
selecting one of the identified plurality of groups for display.

13. The method of claim 1 further comprising:
retrieving a plurality of time stamps of each of the plurality of messages in a first conversation segment;
computing a time interval between a first of the plurality of time stamps representing an earliest message of the plurality of messages and a second of the plurality of time stamps representing a latest message of the plurality of messages;
in response to determining that the computed time interval is longer than a maximum time interval, removing at least one of the earliest and latest messages from the group of consecutively exchanged messages; and
repeating the computing and the removing until the computed time interval is less than the maximum time interval.

14. The method of claim 1, wherein the group is a first group, further comprising:
identifying a second group of consecutively exchanged messages in the first conversation segment that were exchanged over a longer duration than the threshold time interval;
determining that at least one message in the second group includes a graphic, image or video; and
combining the second group with the first group of consecutively exchanged messages in response to determining that the at least one message in the second group includes the graphic, image or video.

15. The method of claim 1, further comprising computing a likelihood or score of the group of consecutively exchanged messages associated with the first user only if the consecutively exchanged messages in the group are exchanged more frequently than a frequency at which a different group of messages are normally exchanged by the first user.

16. A system comprising:
a processor; and
a memory storing instructions, that when executed by the processor, configure the processor to perform operations comprising:
establishing a conversation session between a plurality of users in which a plurality of messages are exchanged between the plurality of users;
after a given message of the plurality of messages is exchanged, receiving input from a first user of the plurality of users to add the given message to a group profile to permanently retain the given message and avoid automatic deletion of the given message;
in response to receiving the input from the first user, determining that the first user adds more than a threshold number of messages to the group profile, each of the threshold number of messages being added to the group profile in response to being selected by one of the users after being exchanged to be included in the group profile allowing the plurality of users to view past messages exchanged in the conversation session;
in response to determining that the first user adds more than the threshold number of messages to the group profile, setting a threshold time interval to a first value, the threshold time interval controlling generation of conversation segments; and
identifying a group of consecutively exchanged messages in a first of a plurality of conversation segments in the group profile for which a difference between a starting time stamp of a first message in the group of consecutively exchanged messages and an ending time stamp of a last message in the group of consecutively exchanged messages is less than the threshold time interval.

17. The system of claim 16, the operations further comprising:
generating for display an interactive visual representation of the identified group of consecutively exchanged messages in a graphical user interface; and
in response to receiving selection of the interactive visual representation, generating for display a portion of the identified group of consecutively exchanged messages in the graphical user interface:
generating for display a first screen that presents a date on which the identified group of consecutively exchanged messages were exchanged;
in response to detecting a first touch input, generating for display a second screen that presents the first message of the consecutively exchanged messages; and
after the second screen is presented, in response to detecting a second touch input, generating for display a third screen that presents a second message of the consecutively exchanged messages together with the first message.

18. The system of claim 17, wherein the first and second touch inputs are configured for detection within any region of the first screen or the second screen configured for touch input.

19. The system of claim 16, wherein the conversation session configured to automatically delete a given message of the plurality of messages after a specified time period, the operations further comprising:
generating the group profile for the plurality of users that includes the plurality of conversation segments, each of the plurality of conversation segments including a plurality of messages previously exchanged between the plurality of users, the given message being added to the group profile in response to receiving the input from the first user.

20. A non-transitory machine-readable storage medium that includes instructions that, when executed by one or more processors of a machine, cause the machine to perform operations comprising:
establishing a conversation session between a plurality of users in which a plurality of messages are exchanged between the plurality of users;
after a given message of the plurality of messages is exchanged, receiving input from a first user of the plurality of users to add the given message to a group profile to permanently retain the given message and avoid automatic deletion of the given message;
in response to receiving the input from the first user, determining that the first user adds more than a threshold number of messages to the group profile, each of the threshold number of messages being added to the group profile in response to being selected by one of the users after being exchanged to be included in the group profile allowing the plurality of users to view past messages exchanged in the conversation session;
in response to determining that the first user adds more than the threshold number of messages to the group profile, setting a threshold time interval to a first value, the threshold time interval controlling generation of conversation segments; and
identifying a group of consecutively exchanged messages in a first of a plurality of conversation segments in the group profile for which a difference between a starting time stamp of a first message in the group of consecutively exchanged messages and an ending time stamp of a last message in the group of consecutively exchanged messages is less than the threshold time interval.

* * * * *